US010669294B2

United States Patent
Goff et al.

(10) Patent No.: US 10,669,294 B2
(45) Date of Patent: Jun. 2, 2020

(54) ALKYL ETHER SUBSTITUTED CYCLOTRISILOXANES AND PREPARATION METHOD THEREOF

(71) Applicant: Gelest Technologies, Inc., Morrisville, PA (US)

(72) Inventors: Jonathan D. Goff, Philadelphia, PA (US); Barry C. Arkles, Pipersville, PA (US)

(73) Assignee: Gelest Technologies, Inc., Morrisville, PA (US)

( * ) Notice: Subject to any disclaimer, the term of this patent is extended or adjusted under 35 U.S.C. 154(b) by 0 days.

(21) Appl. No.: 16/375,174

(22) Filed: Apr. 4, 2019

(65) Prior Publication Data

US 2019/0315780 A1 Oct. 17, 2019

Related U.S. Application Data

(60) Provisional application No. 62/658,681, filed on Apr. 17, 2018.

(51) Int. Cl.
*C07F 7/21* (2006.01)
*C08G 77/12* (2006.01)

(52) U.S. Cl.
CPC .............. *C07F 7/21* (2013.01); *C08G 77/12* (2013.01)

(58) Field of Classification Search
CPC ........................................................ C07F 7/21
See application file for complete search history.

(56) References Cited

U.S. PATENT DOCUMENTS 4,652,661 A * 3/1987 Arai .................. C07F 7/21
549/214

FOREIGN PATENT DOCUMENTS

EP 1845100 A1 10/2007
WO 2019026651 A1 2/2019

OTHER PUBLICATIONS

Gierczyk et al. Cent. Eur. J. Chem. 2014, 12, 624-634 (Year: 2014).*
Frye et al., "Reactions of Organolithium Reagents with Siloxane Substrates," The Journal of Organic Chemistry, vol. 35, No. 5, pp. 1308-1314 (May 1970).
Goff et al., "Living Polymerization Routes to Siloxane Macromers and Higher Order Silicone Structures," Progress in Silicones and Silicone-Modified Materials, Ed S. Clarson, Chapter 5, pp. 59-78 (2013).
Andrianov et al., "Hydride Addition of Diorganosilanes to Organovinylcyclosiloxanes," Bulletin of the Academy of Sciences of the USSR, Division of Chemical Science, pp. 2489-2492 (Jan. 1, 1987).
Gabrielli et al., "Epoxide Opening Versus Silica Condensation during Sol-Gel Hybrid Biomaterial Synthesis," Chem. Eur. J., vol. 19, pp. 7856-7864 (2013).
Gierczyk et al., "Supramolecular complexes of podand ligands with xenon," Cent. Eur. J. Chem., vol. 12, No. 5, pp. 624-634 (2014).
International Search Report and Written Opinion dated Jun. 7, 2019 in International Application No. PCT/US2019/025753.
Khananashvili et al., "Synthesis of epoxy-containing silicon organic compounds," Journal of Chemical and Biochemical Kinetics, vol. 4, No. 4, pp. 235-242 (Jan. 1, 1998) (Abstract Only).
Lee et al., "Synthesis and properties of diarylsiloxane and (aryl/methyl)siloxane polymers: 3. New aryl substituents," Polymer, vol. 35, No. 19, pp. 4197-4202 (1994).

* cited by examiner

*Primary Examiner* — Matthew P Coughlin
(74) *Attorney, Agent, or Firm* — Panitch Schwarze Belisario & Nadel LLP

(57) ABSTRACT

A new class of cyclotrisiloxanes having alkyl ether substituents on one, two, or three of the ring silicon atoms and a method for their preparation are provided. These compounds undergo living anionic ring-opening polymerization to generate unique polymer structures. A new class of hydridosilylethylcyclotrisiloxanes is also described.

19 Claims, No Drawings

ALKYL ETHER SUBSTITUTED CYCLOTRISILOXANES AND PREPARATION METHOD THEREOF

CROSS-REFERENCE TO RELATED APPLICATION

This application claims priority to U.S. Provisional Patent Application No. 62/658,681, filed Apr. 17, 2018, the disclosure of which is herein incorporated by reference in its entirety.

BACKGROUND OF THE INVENTION

Cyclic trisiloxanes or cyclotrisiloxanes can be generally described as ring structures containing six atoms in which three silicon atoms alternate with three oxygen atoms. These compounds are readily differentiated from higher cyclic siloxanes by the fact that they possess appreciable ring strain. Specifically, the nominal ring strain for hexamethylcyclotrisiloxane has been calculated as ~2.5 kcal/mole, compared to ~0.24 kcal/mole for octamethylcyclotetrasiloxane. This difference facilitates a number of ring-opening reactions. Of particular importance is the ability of cyclotrisiloxanes to undergo living AROP (anionic ring-opening polymerization), see C. Frye, *J. Org. Chem.*, 35, 1308; (1970); J. Goff et al., "Living Polymerization Routes to Siloxane Macromers and Higher Order Silicone Structures," *Progress in Silicones and Silicone-Modified Materials*, S. Clarson, Ed., Chapter 5, 59-78 (2013).

The ability to control precise functionality, particularly at high molecular weights, is a primary benefit of living anionic polymerizations. It is generally recognized that the kinetically driven AROP provides better structural control than equilibrium polymerization and is less subject to substituent effects (substitutions on the silicon atoms) that affect equilibrium. It is of great interest in silicone polymer chemistry to introduce alkyl ethers, particularly structures designated as poly(ethylene oxides) or PEGs, onto the silicon atoms of the polymer backbone. The ether structures can act as sites which introduce hydrophilicity into silicone polymers. In the area of living anionic polymerization, the practical ability to introduce alkyl ethers in a controlled manner has been limited by the unavailability of cyclotrisiloxanes such as (methoxyethoxyethoxypropyl)trimethylcyclotrisiloxane. Practical synthesis of members of this class of compounds has not been reported. Thus, there is a need for strained cyclic siloxane systems containing alkyl ethers, in particular alkyl polyethers.

SUMMARY OF THE INVENTION

The invention relates to a cyclotrisiloxane, wherein one, two, or three of the ring silicon atoms has an alkyl ether substituent.

The invention also relates to a hydridosilylethylcyclotrisiloxane having formula (I), wherein $R^1$, $R^2$, and $R^3$ are independently selected from the group selected from methyl and dimethylsilylethyl, wherein at least one of $R^1$, $R^2$, and $R^3$ is dimethylsilylethyl:

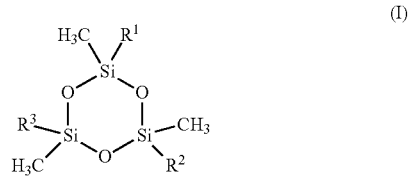

(I)

Finally, the invention relates to a method of preparing a cyclotrisiloxane wherein one, two, or three of the ring silicon atoms has an alkyl ether substituent, the method comprising hydrosilylating a hydride functional cyclotrisiloxane with an allyl ether of an oligo- or poly-alkylene oxide.

DETAILED DESCRIPTION OF THE INVENTION

The present invention is directed to a new class of chemical compounds which are ring-strained cyclotrisiloxanes having one, two, or three alkyl ether substitutions on the ring silicon atoms. The remaining ring silicon atoms have alkyl or aryl substituents, preferably combinations of methyl, ethyl, and phenyl substituents. Most preferably, all of the non-alkyl ether substituents on the ring silicon atoms are methyl groups.

An exemplary compound of this class having three alkyl ether substitutions is 1,3,5-[tris(methoxyethoxypropyltetramethyldisiloxanyl)ethyl]-1,3,5-trimethylcyclotrisiloxane. Another exemplary compound which also has three alkyl ether substitutions, 1,3,5-[tris(methoxyethoxyethoxypropyltetramethyldisiloxanyl)ethyl]-1,3,5-trimethylcyclotrisiloxane, has formula (1) below.

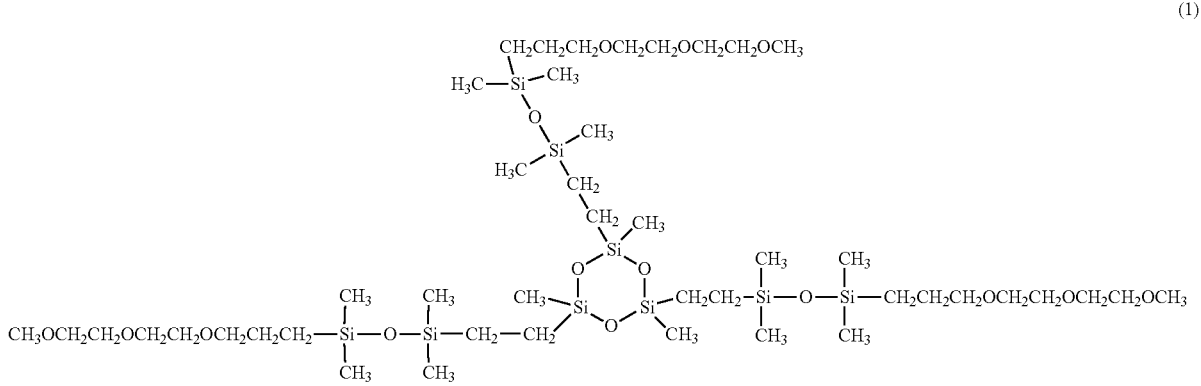

(1)

An exemplary cyclotrisiloxane having one alkyl ether substitution, (methoxyethoxyethoxypropyltetramethyldisilylethyl)pentamethylcyclotrisiloxane, has formula (2) below.

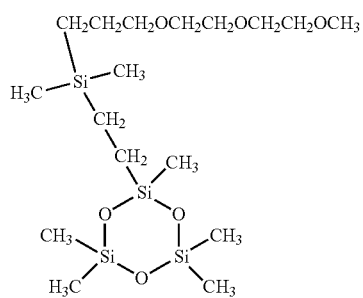
(2)

The number of alkyl ether (ethylene oxide) groups, alternately known as PEG units, does not have to be discrete, but can be polymeric with an average number of m units, as shown in formula (3). From a practical perspective, m can be an integer from 1 to about 10, more preferably 1 to about 4, but theoretically can be as high as about 50.

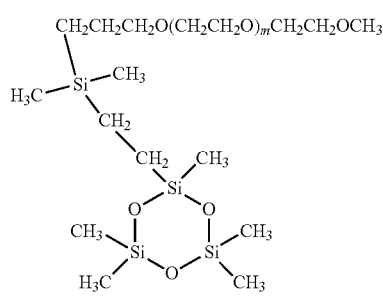
(3)

The alkyl ether substitutions may be to ring silicons via silylethyl linkages, as shown in formulas (2) and (3). It is also within the scope of the invention to utilize the more general silylalkyl linkage, in which the alkyl group is other than ethyl, such as alkyl groups having 3 to about 8 or even more carbon atoms. However, silylethyl are the most preferred silylalkyl linkages.

Alternatively, the alkyl ether substitutions may be through siloxanylethyl linkages on the ring silicons, as shown in formulas (1) and (4). In formula (4), when n is 0, the substituent has a silylethyl substitution, and when n is 1 or greater, the substituent has a siloxanylethyl linkage. Preferably, n is 0 or 1 but may be any integer of 0 or higher. In formula (4), m is 1 to about 10, more preferably 1 to about 4, R' is H or an alkyl or aryl group, preferably H, and R is methyl, ethyl, or butyl, preferably methyl. When there are multiple (OCH$_2$CHR') groups, R' may be the same or different.

While exemplary alkylether substituents are shown in formulas (1) to (3), the alkyl ether substituent is more generally depicted in formula (4). Such a substituent may be generally referred to as alkoxy(alkylenoxy)$_m$propyl, in which m is 1 to about 10, more preferably 1 to about 4, each terminal alkoxy group is methoxy, ethoxy, or butoxy, and the alkylenoxy group is preferably ethylenoxy or propylenoxy.

When a cyclotrisiloxane contains two or three alkyl ether substituents, it is within the scope of the invention for them to be the same or different.

The alkyl ether substituted cyclotrisiloxanes according to the invention may be prepared by hydrosilylation of the corresponding hydride-functional cyclotrisiloxane with an allyl ether of an oligo- or poly-alkylene oxide. For compounds having silylethyl substitution, the preferred intermediate compounds are (dimethysilyl)ethylpentamethylcyclotrisiloxane, having formula (5), and tris[(dimethylsilyl)ethyl]trimethylcyclotrisiloxane, having formula (6).

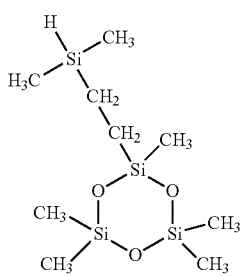
(5)

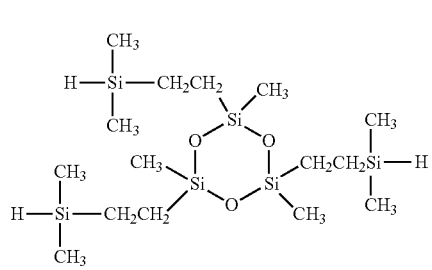
(6)

These intermediate insoluble hydridosilylethylcyclotrisiloxanes, more generally having formula (I), are also with the scope of the present invention.

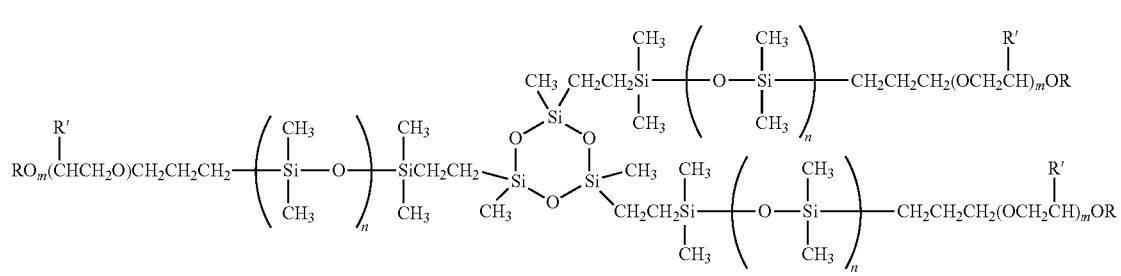
(4)

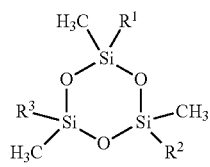

(I)

In formula (I), $R^1$, $R^2$, and $R^3$ are independently selected from the group selected from methyl, ethyl, phenyl, and dimethylsilylethyl, more preferably methyl and dimethylsilylethyl, wherein at least one of $R^1$, $R^2$, and $R^3$ is dimethylsilylethyl.

Chloro- or vinyl-substituted (dimethylsilyl)ethylcyclotrisiloxanes, such as those shown in formulas (7) and (8), may be reacted with an excess of tetramethyldisiloxane to form hydridosiloxanylethylsiloxanes, such as those having formulas (9) and (10). Such compounds are described in a co-pending application of the inventors, which is incorporated herein by reference in its entirety, and may be used as intermediates to form the inventive compounds, as shown in Schemes I and II below.

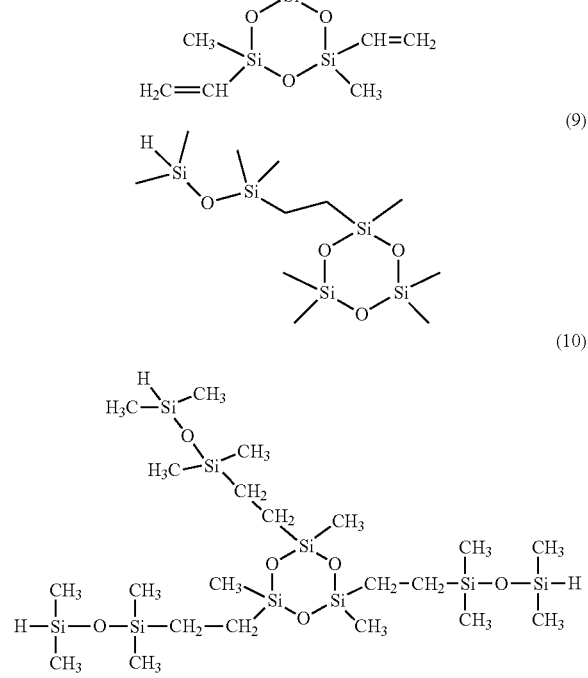

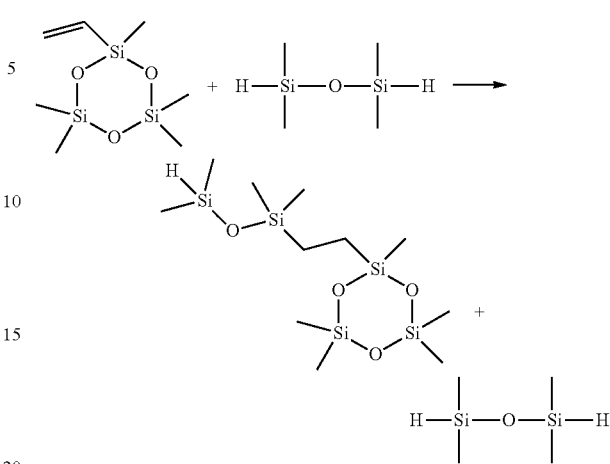

(Scheme I)

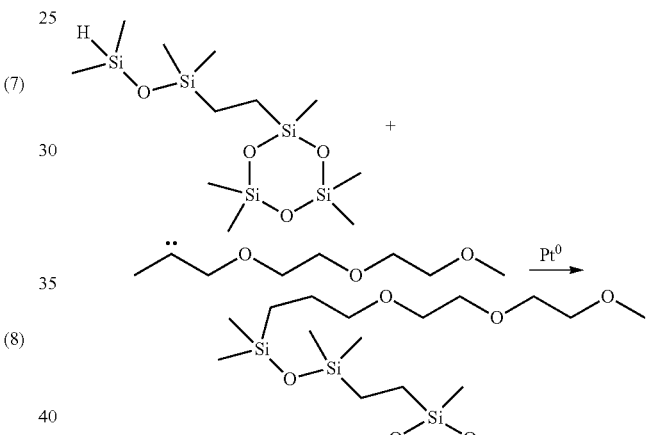

(Scheme II)

The cyclotrisiloxanes according to the invention undergo living anionic ring-opening polymerization, generating unique polymer structures.

The invention will now be described in connection with the following, non-limiting example.

Example: Synthesis of 1,3,5-[tris(methoxyethoxyethoxypropyltetramethyldisiloxanyl)ethyl]-1,3,5-trimethylcyclotrisiloxane (1)

A 5-L 4-necked flask equipped with an overhead stirrer, pot thermometer, reflux condenser, water bath, and addition funnel was blanketed with nitrogen and charged with 271.3 g (1.7 moles) of allyloxy(diethylene oxide)methyl ether. The flask was heated to 55° C. and 0.3 g (10 ppm Pt) of Karstedt's catalyst was added. 280 g (0.4 moles) of tris(tetramethyldisiloxanylethyl)trimethylcyclotrisiloxane (formula (10)) was then added dropwise at an appropriate rate to maintain the reaction temperature at ~95° C. The mixture was stirred for two hours, after which no hydride groups were observed in $^1$H-NMR. The pot was then stripped at 135° C./2.5 mmHg. The resulting oil (461 g) had a viscosity of 41.7 cPs.

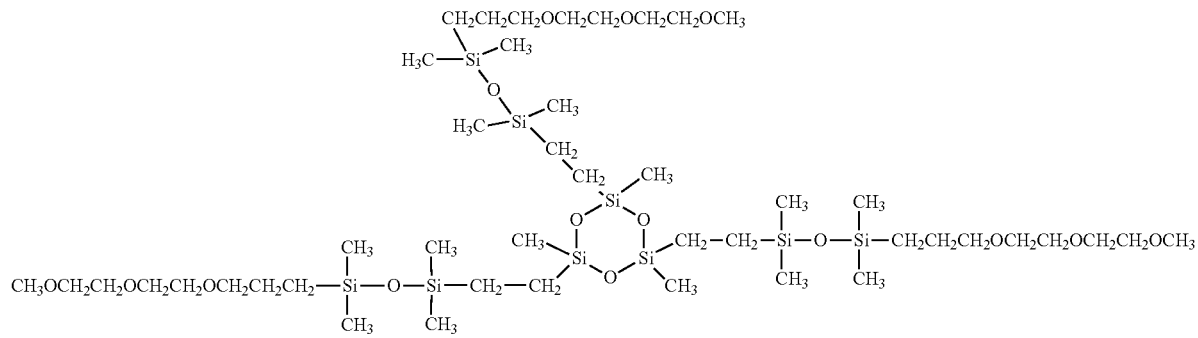
(1)

It will be appreciated by those skilled in the art that changes could be made to the embodiment described above without departing from the broad inventive concepts thereof. Also, based on this disclosure, a person of ordinary skill in the art would further recognize that the relative proportions of the components illustrated above could be varied without departing from the spirit and scope of the invention. It is understood, therefor, that this invention is not limited to that particular embodiment disclosed, but it is intended to cover modifications within the spirit and scope of the present invention as defined by the appended claims.

We claim:

1. A cyclotrisiloxane wherein one, two, or three of the ring silicon atoms has a polyalkyleneoxide substituent comprising two or more ethylene oxide groups, wherein each polyalkyleneoxide substituent is bonded to the ring silicon atom by a silylalkyl linkage or a siloxanylethyl linkage.

2. The cyclotrisiloxane according to claim 1, having formula (1):

3. The cyclotrisiloxane according to claim 1, having formula (2):

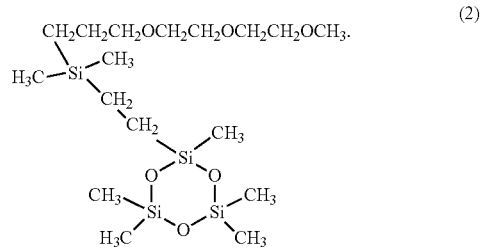
(2)

4. The cyclotrisiloxane according to claim 1, having formula (3), wherein m is 1 to about 10:

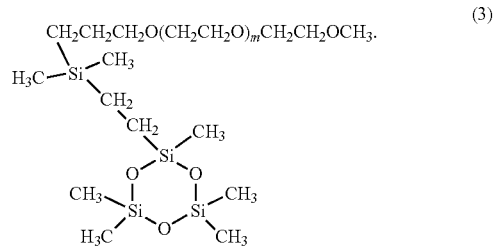
(3)

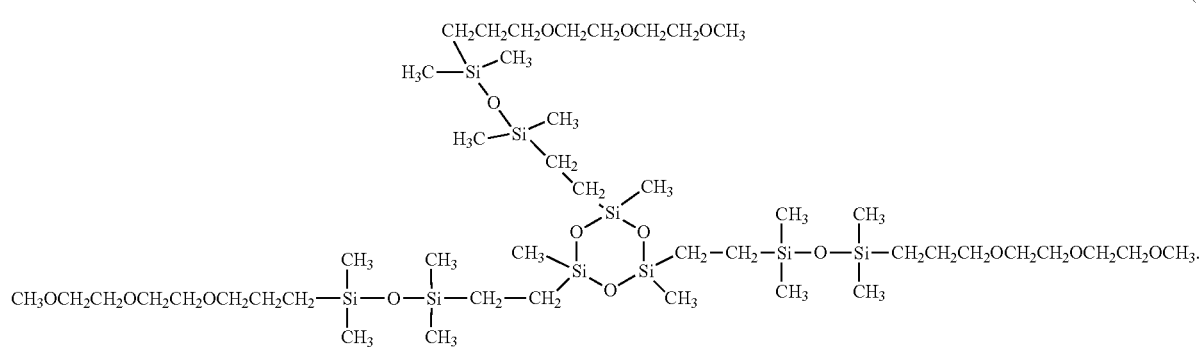
(1)

5. A cyclotrisiloxane having formula (4):

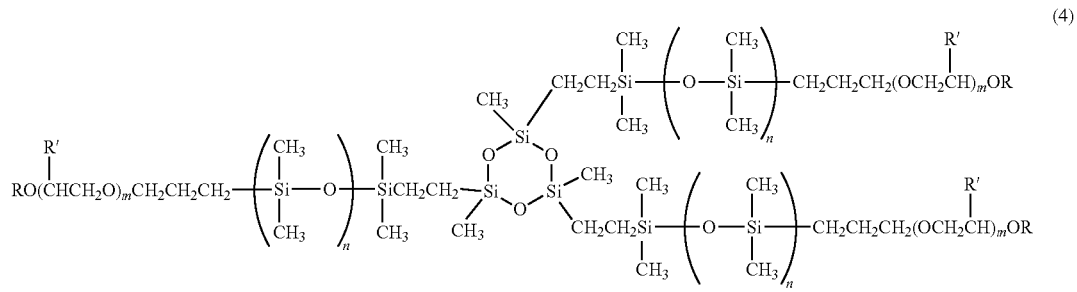

wherein m is an integer from 1 to about 10, n is an integer of at least 0, R is methyl, ethyl, or butyl, and R' is H, an alkyl or an aryl group.

6. The cyclotrisiloxane according to claim 1, wherein each polyalkyleneoxide bonds to the ring silicon by a silylalkyl linkage, wherein the alkyl group has 2 to 8 carbon atoms.

7. The cyclotrisiloxane according to claim 1, wherein each polyalkyleneoxide substituent bonds to the ring silicon by a siloxanylethyl linkage.

8. A cyclotrisiloxane wherein one, two, or three of the ring silicon atoms has a polyalkyleneoxide substituent, wherein each polyalkyleneoxide substituent is bonded to the ring silicon atom by a silylalkyl linkage or a siloxanylethyl linkage, wherein each polyalkyleneoxide substituent is an alkoxyalkylenoxypropyl substituent, the alkoxy group is methoxy, ethoxy, or butoxy, and the alkylenoxy group is ethylenoxy or propylenoxy.

9. A cyclotrisiloxane wherein one, two, or three of the ring silicon atoms has a polyalkyleneoxide substituent, wherein each polyalkyleneoxide substituent is bonded to the ring silicon atom by a silylalkyl linkage or a siloxanylethyl linkage, wherein each polyalkyleneoxide substituent is an alkoxyalkoxyalkylenoxypropyl substituent, wherein each alkoxy group is independently methoxy, ethoxy, or butoxy, and wherein the alkylenoxy group is ethylenoxy or propylenoxy.

10. A cyclotrisiloxane wherein one, two, or three of the ring silicon atoms has a polyalkyleneoxide substituent, wherein each polyalkyleneoxide substituent is bonded to the ring silicon atom by a silylalkyl linkage or a siloxanylethyl linkage, wherein each polyalkyleneoxide substituent is alkoxy(alkylenoxy)$_m$propyl, wherein the alkoxy group is methoxy, ethoxy, or butoxy, the alkylenoxy group is ethylenoxy or propylenoxy, and m is 1 to about 10.

11. A hydridosilylethylcyclotrisiloxane having formula (1), wherein $R^1$, $R^2$, and $R^3$ are independently selected from the group selected from methyl and dimethylsilylethyl, wherein at least one of $R^1$, $R^2$, and $R^3$ is dimethylsilylethyl:

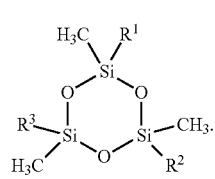

12. The hydridosilylethylcyclotrisiloxane according to claim 11, having formula (5):

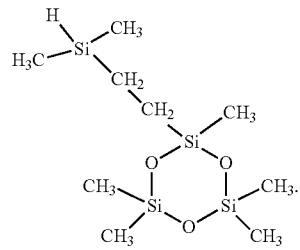

13. The hydridosilylethylcyclotrisiloxane according to claim 11, having formula (6):

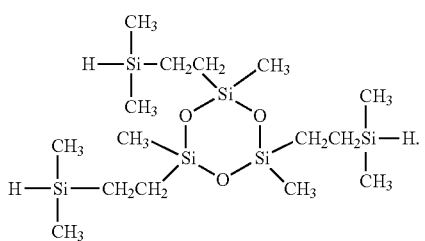

14. A method of preparing a cyclotrisiloxane wherein one, two, or three of the ring silicon atoms has a polyalkyleneoxide substituent comprising two or more ethylene oxide groups, wherein each polyalkylene oxide substituent is bonded to the ring silicon atom by a silylalkyl linkage or a siloxanylethyl linkage, the method comprising hydrosilylating a hydride functional cyclotrisiloxane with an allyl ether of an oligo- or poly-alkylene oxide to yield a cyclotrisiloxane according to claim 1.

15. The method according to claim 14, wherein the hydride functional cyclotrisiloxane has formula (I), wherein $R^1$, $R^2$, and $R^3$ are independently selected from the group selected from methyl and dimethylsilylethyl, wherein at least one of $R^1$, $R^2$, and $R^3$ is dimethylsilylethyl:

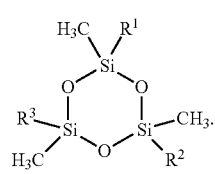

16. The method according to claim 14, wherein the hydride functional cyclotrisiloxane has formula (5):

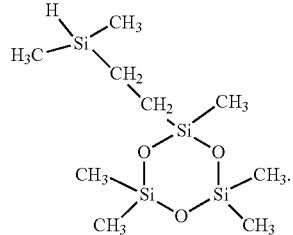

(5)

17. The method according to claim 14, wherein the hydride functional cyclotrisiloxane has formula (6):

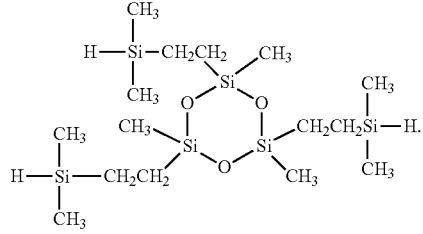

(6)

18. The method according to claim 14, wherein the hydride functional cyclotrisiloxane has formula (7):

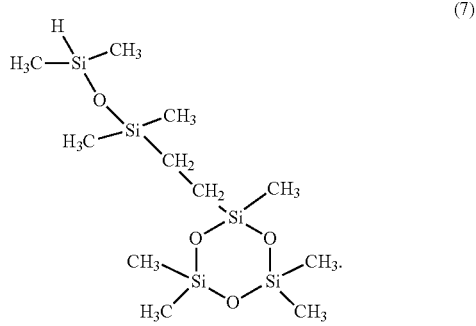 [SMILES: C[SiH](C)O[Si](C)(C)CC[Si]1(C)O[Si](C)(C)O[Si](C)(C)O1]

(7)

19. The method according to claim 14, wherein the hydride functional cyclotrisiloxane has formula (8):

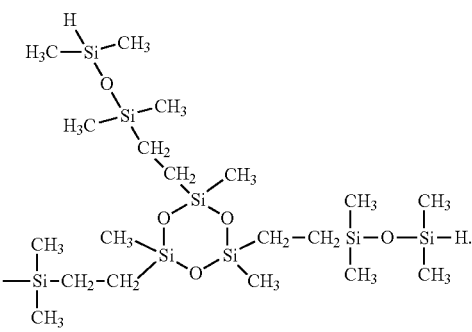

(8)

* * * * *